(12) United States Patent
Cho

(10) Patent No.: US 7,852,648 B2
(45) Date of Patent: Dec. 14, 2010

(54) POWER SUPPLY CONTROL APPARATUS AND METHOD OF USING THE SAME

(75) Inventor: Jong-hwa Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 11/593,040

(22) Filed: Nov. 6, 2006

(65) Prior Publication Data
US 2007/0211505 A1 Sep. 13, 2007

(30) Foreign Application Priority Data
Mar. 3, 2006  (KR) ............... 10-2006-0020389

(51) Int. Cl.
*H02M 7/72* (2006.01)
*H02M 7/79* (2006.01)
*H02M 7/797* (2006.01)

(52) U.S. Cl. .................. 363/97; 363/21.1; 399/88

(58) Field of Classification Search ........... 363/21.04, 363/21.05, 21.1, 21.11, 21.12, 21.13, 21.18, 363/97; 399/37, 88
See application file for complete search history.

(56) References Cited

U.S. PATENT DOCUMENTS

| | | | | |
|---|---|---|---|---|
| 4,558,310 A | * | 12/1985 | McAllise | 340/661 |
| 4,642,748 A | * | 2/1987 | Kirk | 363/95 |
| 5,014,178 A | * | 5/1991 | Balakrishnan | 363/49 |
| 5,202,725 A | * | 4/1993 | Oku | 355/69 |
| 5,986,241 A | * | 11/1999 | Funahashi | 219/497 |
| 6,369,557 B1 | | 4/2002 | Agiman | |
| 6,703,893 B1 | | 3/2004 | Isham | |
| 6,775,164 B2 | * | 8/2004 | Wong et al. | 363/147 |
| 7,176,660 B2 | * | 2/2007 | Usui et al. | 323/207 |
| 2003/0214820 A1 | * | 11/2003 | Nakata | 363/21.01 |
| 2004/0228049 A1 | | 11/2004 | Chae et al. | |
| 2006/0083030 A1 | * | 4/2006 | Lai et al. | 363/16 |

FOREIGN PATENT DOCUMENTS

| | | |
|---|---|---|
| CN | 1574586 | 2/2005 |
| JP | 08-187918 | 7/1996 |
| KR | 10-2003-0091375 B1 * | 12/2003 |
| KR | 10-2004-98208 | 11/2004 |
| KR | 10-2005-106557 | 11/2005 |
| KR | 1020050118323 A | 12/2005 |

* cited by examiner

*Primary Examiner*—Gary L Laxton
*Assistant Examiner*—Nusrat J Quddus
(74) *Attorney, Agent, or Firm*—Roylance, Abrams, Berdo & Goodman, L.L.P.

(57) ABSTRACT

A power supply control apparatus and method are provided. The apparatus includes a controller outputting a first pulse width modulation (PWM) signal for supplying an electric power and a second PWM signal to be compared to the first PWM signal, a first PWM signal input unit converting the second PWM signal to a direct current (DC) signal, a second PWM signal input unit receiving the converted second PWM signal, a comparator comparing the first PWM signal and the converted second PWM signal, a switching unit generating a waveform having a voltage according to the comparison result of the comparator, a transformer transforming the voltage of the generated pulse waveform according to the switching result of the switching unit and a rectifier and voltage divider for rectifying and voltage-dividing the transforming result of the transformer, wherein the controller adjusts the second PWM signal by receiving the rectifying and voltage-dividing result of the rectifier & voltage divider.

22 Claims, 3 Drawing Sheets

POWER SUPPLY CONTROL APPARATUS AND METHOD OF USING THE SAME

CROSS-REFERENCE TO RELATED PATENT APPLICATIONS

This application claims the benefit under 35 U.S.C. §119(a) of Korean Patent Application No. 10-2006-0020389, filed on Mar. 3, 2006, in the Korean Intellectual Property Office, the entire disclosure of which is hereby incorporated by reference.

BACKGROUND OF THE INVENTION

1. Field of the Invention

The present invention relates to a high voltage output device applied to laser printers and laser multi function peripherals (MFPs). More particularly, the present invention relates to a power control apparatus and method for addressing a problem in image quality by constantly controlling an alternating current (AC) power used for developing.

2. Description of the Related Art

AC power is very important in image forming devices, such as laser beam printers (LBPs), which are a contactless developing method.

FIG. 1 is a circuit diagram of an apparatus known in the prior art for controlling electric power supplied to a developing unit.

As illustrated in FIG. 1, the prior art power control apparatus includes a pulse width modulation (PWM) input unit 10 receiving a PWM signal from an engine controller (CPU: Central Processing Unit) (not shown), a comparator 20 comparing the PWM signal to a reference signal, a switching unit 30 forming a reference comparison output signal using a voltage Vcc, and a transformer 400 transforming a switching result into a high voltage, in order to output an AC power of a high voltage. The AC power output from the transformer 400 is applied to the developing unit.

The prior art apparatus is configured to output a constant voltage in response to an input PWM signal. However, since a feedback control is not performed, deviation of an output voltage occurs according to an environment. The variation of the output voltage is caused by an environmental characteristic (temperature/humidity) of each of the components constructing the prior art circuit and the variation of a load (the developing unit) connected to a high voltage output terminal.

Thus, if the AC power supplied to the developing unit cannot output a voltage as required by a process, a problem in image quality occurs. That is, if a voltage higher or lower than the required voltage is applied to the developing unit, a problem in image quality occurs.

Accordingly, there is a need for an improved power supply apparatus and method of its use.

SUMMARY OF THE INVENTION

Exemplary embodiments of the present invention address at least the above problems and/or disadvantages and provide at least the advantages described below. Accordingly, an aspect of the present invention is to provide a power supply control apparatus and method for supplying an optimal voltage by compensating for an output voltage when a voltage variation occurs according to an environment, a load or other factors.

According to an exemplary aspect of the present invention, there is provided a power supply control apparatus comprising a controller outputting a first pulse width modulation (PWM) signal for supplying an electric power and a second PWM signal to be compared to the first PWM signal, a first PWM signal input unit converting the second PWM signal to a direct current (DC) signal, a second PWM signal input unit receiving the converted second PWM signal, a comparator comparing the first PWM signal and the converted second PWM signal, a switching unit generating a pulse waveform having a voltage according to the comparison result of the comparator, a transformer transforming the voltage of the generated pulse waveform according to the switching result of the switching unit and a rectifier and voltage divider for rectifying and voltage-dividing the transforming result of the transformer, wherein the controller adjusts the second PWM signal by receiving the rectifying and voltage-dividing result of the rectifier and voltage divider.

According to another exemplary aspect of the present invention, there is provided a power supply control method comprising outputting a first pulse width modulation (PWM) signal for supplying an electric power and a second PWM signal to be compared to the first PWM signal, converting the second PWM signal to a direct current (DC) signal, comparing the first PWM signal to the converted second PWM signal, generating a pulse waveform having a voltage according to the comparison result, transforming the voltage of the generated pulse waveform, rectifying and voltage-dividing the transforming result and adjusting the second PWM signal according to the rectifying and voltage-dividing result.

BRIEF DESCRIPTION OF THE DRAWINGS

The above and other features and advantages of the present invention will become more apparent by describing in detail exemplary embodiments thereof with reference to the attached drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described more fully with reference to the accompanying drawings.

Figure 1:
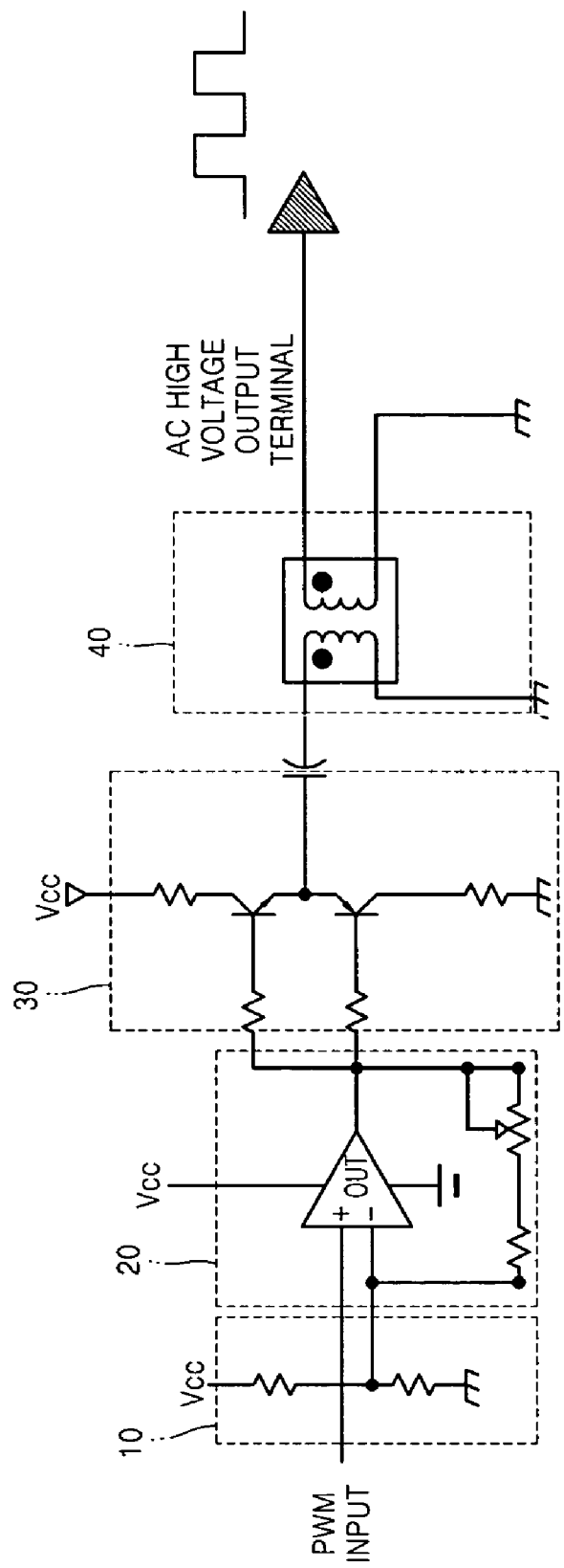
FIG. 1 is a circuit diagram of an apparatus known in the prior art for controlling an electric power supplied to a developing unit.
Figure 2:
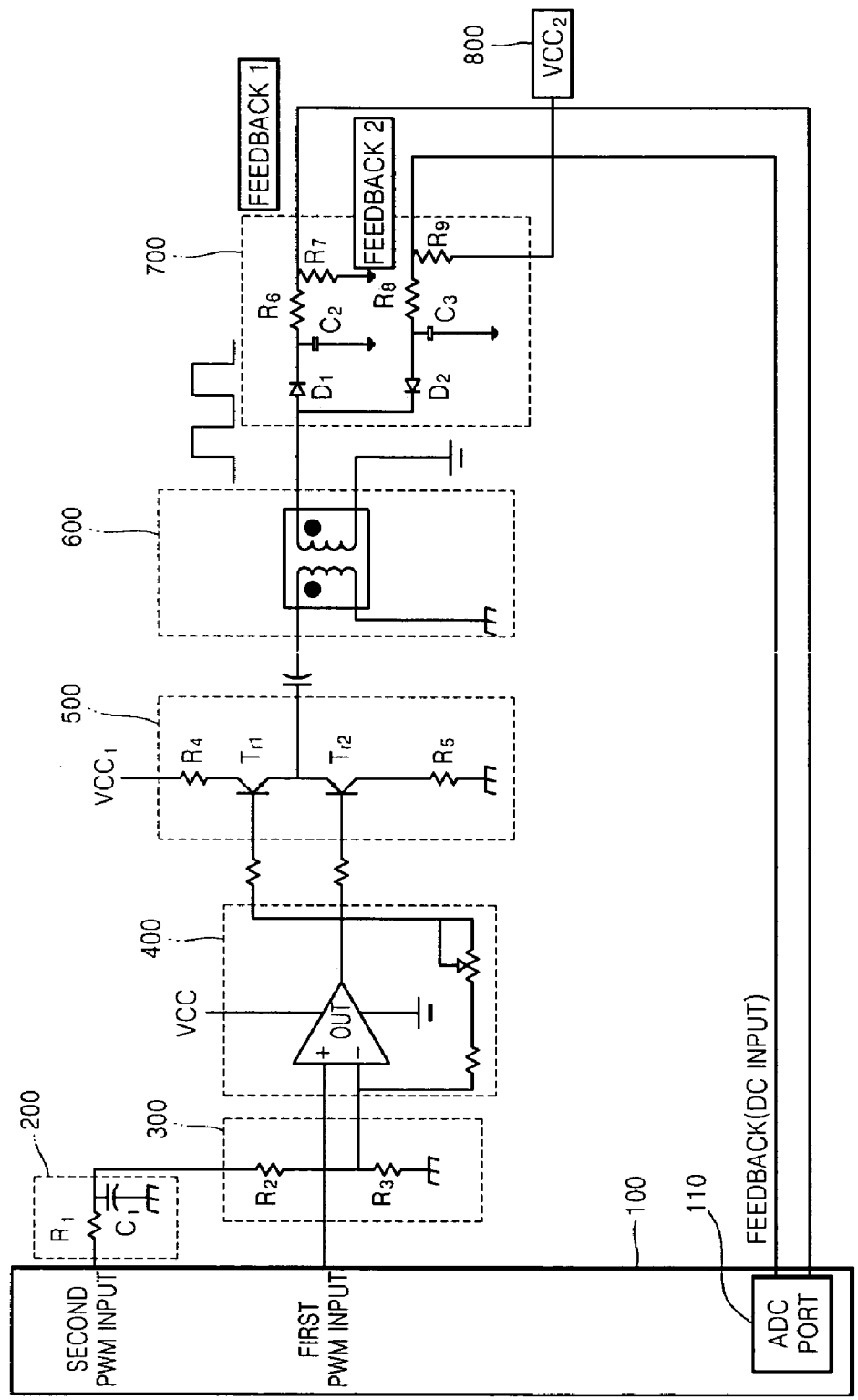
FIG. 2 is a block diagram of a power supply control apparatus according to an exemplary embodiment of the present invention.

FIG. 2 is a block diagram of a power supply control apparatus according to an exemplary embodiment of the present invention. Referring to FIG. 2, the power supply control apparatus includes a controller 100, a first PWM signal input unit 200, a second PWM signal input unit 300, a comparator 400, a switching unit 500, a transformer 600, and a rectifier and voltage divider 700.

The controller 100 outputs a first PWM signal for supplying an electric power and a second PWM signal to be compared to the first PWM signal.

The first PWM signal is a signal for supplying an AC power having a high voltage. The second PWM signal is a signal to be compared to the first PWM signal by the comparator 400. A duty ratio of the second PWM signal is adjusted by the controller 100.

The first PWM signal input unit 200 converts the second PWM signal output from the controller 100 into a DC signal and outputs the conversion result to the second PWM signal input unit 300. The first PWM signal input unit 200 includes a resistor $R_1$ and a capacitor $C_1$ to convert the second PWM signal into the DC signal.

The second PWM signal input unit 300 receives the DC-converted second PWM signal from the first PWM signal input unit 200. The second PWM signal input unit 300 voltage-divides the second PWM signal. To do this, the second PWM signal input unit 300 includes at least two resistors $R_2$ and $R_3$. The second PWM signal input unit 300 outputs the voltage-divided second PWM signal to the comparator 400.

The comparator 400 compares the first PWM signal and the voltage-divided second PWM signal which are input from the second PWM signal input unit 300, and outputs the comparison result to the switching unit 500.

The switching unit 500 generates a waveform having a voltage $VCC_1$ according to the comparison result of the comparator 400 and outputs the generated waveform to the transformer 600. In an exemplary embodiment, the waveform may be a pulse waveform.

The switching unit 500 generates the waveform having the voltage $VCC_1$ according to on/off operations of transistors and includes at least two transistors $T_{r1}$ and $T_{r2}$ and at least two resistors $R_4$ and $R_5$.

The transformer 600 transforms the voltage of the generated waveform to an AC high voltage according to the switching result of the switching unit 500 and outputs the transformed AC high voltage to a developing unit (not shown) and the rectifier and voltage divider 700.

The rectifier and voltage divider 700 rectifies and voltage-divides the AC high voltage transformed by the transformer 600 and the rectifying and voltage-dividing result to the controller 100.

The rectifier and voltage divider 700 includes at least one diode $D_1$, a capacitor $C_2$, and resistors $R_6$ and $R_7$ to rectify and voltage-divide a positive (+) voltage of the AC high voltage of the transformer 600.

The rectifier and voltage divider 700 also includes at least one diode $D_2$, a capacitor $C_3$, and resistors $R_8$ and $R_9$ to rectify and voltage-divide a negative (−) voltage of the AC high voltage of the transformer 600. The directions of the diode $D_2$ and the diode $D_1$ are opposite to each other.

The rectified and voltage-divided negative (−) voltage must be a positive (+) voltage in order to be input to the controller 100. To do this, a voltage applying unit 800 applies a voltage $VCC_2$ to the rectifier and voltage divider 700. The voltage $VCC_2$ may have a value at least greater than the absolute value of the rectified and voltage-divided negative (−) voltage. The negative voltage becomes a positive voltage by the voltage applying unit 800 supplying the voltage $VCC_2$, and the positive voltage is input to the controller 100.

The controller 100 adjusts the second PWM signal by receiving the rectifying and voltage-dividing result from the rectifier and voltage divider 700. The controller 100 includes an analog-to-digital converter (ADC) 110 for receiving the rectifying and voltage-dividing result of the rectifier and voltage divider 700.

If the controller 100 determines that the output voltage of the transformer 600 is lower than a reference value by referring to the rectifying and voltage-dividing result of the rectifier and voltage divider 700, the controller 100 adjusts the duty ratio of the second PWM signal to high, and if the controller 100 determines that the output voltage of the transformer 600 is higher than the reference value by referring to the rectifying and voltage-dividing result of the rectifier and voltage divider 700, the controller 100 adjusts the duty ratio of the second PWM signal to low. For example, if the reference value of the output voltage is set to 1500V, and if it is determined that the output voltage of the transformer 600 is 1200V from the rectifying and voltage-dividing result of the rectifier and voltage divider 700, the controller 100 increases the amplitude of a DC component of the second PWM signal rectified by the first PWM signal input unit 200 by adjusting the duty ratio of the second PWM signal to high. An increase of the amplitude of a DC component of the second PWM signal compared to the first PWM signal results in an increase of the amplitude of the output voltage to be output from the transformer 600 thereafter. On the contrary, if the reference value of the output voltage is set to 1500V, and if it is determined that the output voltage of the transformer 600 is 1700V from the rectifying and voltage-dividing result of the rectifier and voltage divider 700, the controller 100 decreases the amplitude of the DC component of the second PWM signal rectified by the first PWM signal input unit 200 by adjusting the duty ratio of the second PWM signal to low. A decrease of the amplitude of a DC component of the second PWM signal compared to the first PWM signal results in a decrease of the amplitude of the output voltage to be output from the transformer 600 thereafter.

A power supply control method according to an exemplary embodiment of the present invention will now be described in detail with reference to the accompanying drawing.

Figure 3:
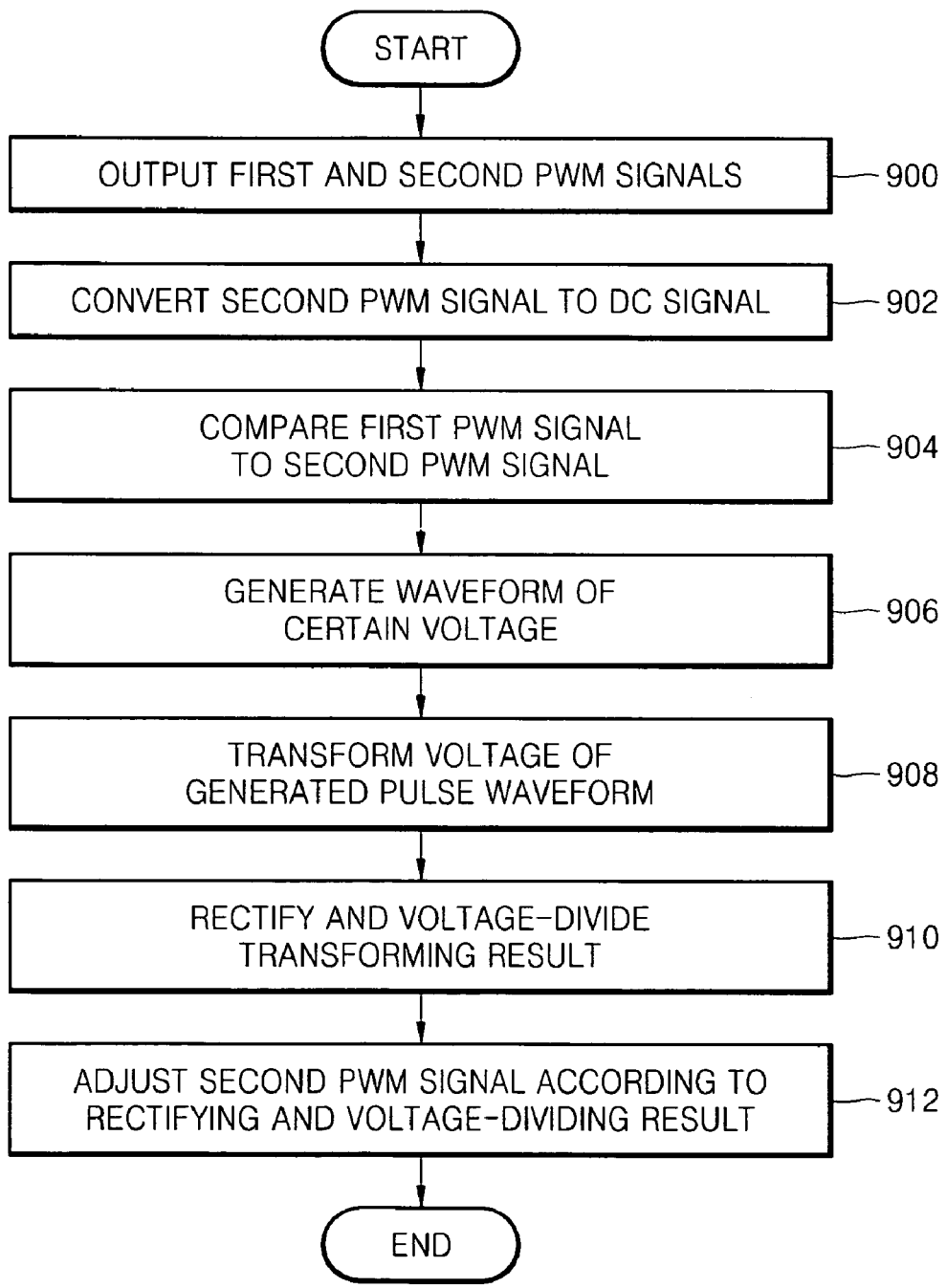
FIG. 3 is a flowchart illustrating a power supply control method according to an exemplary embodiment of the present invention.

FIG. 3 is a flowchart illustrating a power supply control method according to an exemplary embodiment of the present invention.

Referring to FIG. 3, in operation 900, a first PWM signal for supplying an electric power and a second PWM signal to be compared to the first PWM signal are output.

The first PWM signal is a signal for supplying an AC power having a high voltage. The second PWM signal is a signal compared to the first PWM signal by the comparator 400 and is used to adjust a duty ratio of the second PWM signal.

In operation 902, the second PWM signal is converted into a DC signal.

In operation 904, the first PWM signal is compared to the converted second PWM signal.

In operation 906, a waveform having a certain voltage is generated according to the comparison result. In an exemplary embodiment, the waveform may be a pulse waveform.

In operation 908, the voltage of the generated waveform is transformed.

In operation 910, the transforming result is rectified and voltage-divided.

In the rectifying and voltage-dividing of the transforming result, a positive (+) voltage or a negative (−) voltage of an AC high voltage corresponding to the transforming result is rectified and voltage-divided.

The rectified and voltage-divided negative (−) voltage must be a positive (+) voltage in order to be input to the controller 100 of FIG. 2. To do this, a voltage $VCC_2$ is applied to the rectified and voltage-divided negative (−) voltage. The voltage $VCC_2$ may have a value at least greater than the absolute value of the rectified and voltage-divided negative (−) voltage. The negative voltage becomes a positive voltage by supplying the voltage $VCC_2$, and the positive voltage is input to the controller 100 of FIG. 2.

In operation 912, the second PWM signal is adjusted according to the rectifying and voltage-dividing result.

If it is determined that the transformed voltage is lower than a reference value by referring to the rectifying and voltage-dividing result, the duty ratio of the second PWM signal is adjusted to high, and if it is determined that the transformed voltage is higher than the reference value by referring to the rectifying and voltage-dividing result, the duty ratio of the second PWM signal is adjusted to low.

Exemplary embodiments of the present invention can be written as codes/instructions/programs and can be implemented in general-use digital computers that execute the codes/instructions/programs using a computer readable recording medium. Examples of the computer readable recording medium include magnetic storage media (e.g., ROM, floppy disks, hard disks, etc.), optical recording media (e.g., CD-ROMs, or DVDs). It is also envisioned that carrier waves (e.g., transmission through the Internet) can be utilized as an equivalent to a computer readable medium. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, by a power supply control apparatus and method according to exemplary embodiments of the present invention, an optimal voltage is supplied by compensating for an output voltage when a voltage variation occurs according to an environment, a load or other factors, an image of good quality can be printed.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A power supply control apparatus comprising:
   a controller for outputting a first pulse width modulation (PWM) signal supplying alternating current (AC) power and a second PWM signal;
   a first PWM signal input unit for converting the second PWM signal to a direct current (DC) signal;
   a comparator for comparing the first PWM signal and the converted second PWM signal;
   a transformer for producing an output voltage being an alternating current (AC) signal according to the comparison of the first PWM signal and the converted second PWM signal; and
   a rectifier and voltage divider coupled to the transformer for rectifying and voltage-dividing the output voltage of the transformer,
   wherein the output voltage of the transformer is supplied to a load, and the rectifying and voltage-dividing result is fed back to the controller,
   wherein the controller adjusts the second PWM signal according to the fed back rectifying and voltage-dividing result in order to reduce a fluctuation of the output voltage of the transformer due to impedance fluctuation of the load.

2. The power supply control apparatus of claim 1, wherein the controller comprises an analog-to-digital converter (ADC) for receiving the rectifying and voltage-dividing result of the rectifier and voltage divider.

3. The power supply control apparatus of claim 1, wherein the controller adjusts a duty ratio of the second PWM signal to high if the controller determines that the output voltage of the transformer is lower than a reference value, and adjusts the duty ratio of the second PWM signal to low if the controller determines that the output voltage of the transformer is higher than the reference value.

4. The power supply control apparatus of claim 2, wherein the controller determines that the output voltage of the transformer is lower or higher than a reference value by referring to the rectifying and voltage dividing result of the rectifier and voltage divider.

5. The power supply control apparatus of claim 1, wherein the first PWM signal input unit comprises a resistor and a capacitor to convert the second PWM signal into a DC signal.

6. The power supply control apparatus of claim 1, further comprising a second PWM signal input unit for receiving the converted second PWM signal, wherein the second PWM signal input unit comprises at least two resistors to voltage-divide the second PWM signal.

7. The power supply control apparatus of claim 1 further comprising a switching unit for generating a waveform having a voltage according to the comparison result of the comparator, wherein the switching unit comprises at least two transistors and at least two resistors to generate the pulse waveform having a voltage, and wherein the transformer transforms the voltage of the generated pulse waveform according to the switching result of the switching unit.

8. The power supply control apparatus of claim 1, wherein the rectifier and voltage divider comprises at least one diode, one capacitor, and one resistor to rectify and voltage-divide a positive (+) voltage corresponding to the transforming result of the transformer.

9. The power supply control apparatus of claim 1, wherein the rectifier and voltage divider comprises at least one diode, one capacitor, and one resistor to rectify and voltage-divide a negative (−) voltage corresponding to the transforming result of the transformer.

10. The power supply control apparatus of claim 9, further comprising a voltage applying unit for applying a voltage to the rectifier and voltage divider to input the rectified and voltage-divided negative (−) voltage to the controller.

11. The power supply control apparatus of claim 10, wherein the voltage has a value at least greater than the absolute value of the rectified and voltage-divided negative (−) voltage.

12. A power supply control method comprising:
   outputting by a controller a first pulse width modulation (PWM) signal supplying alternating current (AC) power and a second PWM signal;
   converting the second PWM signal to a direct current (DC) signal;
   comparing the first PWM signal to the converted second PWM signal to generate a comparison result;
   transforming by a transformer a voltage of the generated waveform to produce an output voltage being an alternating current (AC) signal according to the comparison result;
   rectifying and voltage-dividing the output voltage of the transformer to generate a rectifying and voltage-dividing result; and
   adjusting by the controller the second PWM signal according to the rectifying and voltage-dividing result, wherein the output voltage of the transformer is supplied to a load, and the rectifying and voltage-dividing result is fed back to the controller, and wherein the controller adjusts the second PWM signal according to the rectifying and voltage-dividing result in order to reduce a fluctuation of the output voltage of the transformer due to impedance fluctuation of the load.

13. The power supply control method of claim 12 further comprising generating a pulse waveform having a voltage according to the comparison result, and wherein the transforming comprises transforming the voltage of the generated waveform.

14. The power supply control method of claim 12, wherein the rectifying and voltage-dividing of the transforming result comprises rectifying and voltage-dividing at least one of a positive (+) and a negative (−) voltage corresponding to the transforming result.

15. The power supply control method of claim 14, wherein a voltage is applied to the rectified and voltage-divided negative (−) voltage.

16. The power supply control method of claim 15, wherein the voltage has a value at least greater than the absolute value of the rectified and voltage-divided negative (−) voltage.

17. The power supply control method of claim 12, wherein the adjusting of the second PWM signal comprises adjusting a duty ratio of the second PWM signal to high if it is determined that the transformed voltage is lower than a reference value by referring to the rectifying and voltage-dividing result, and adjusting the duty ratio of the second PWM signal to low if it is determined that the transformed voltage is higher than the reference value by referring to the rectifying and voltage-dividing result.

18. A computer readable recording medium having stored thereon instructions for executing a power supply control method, the instructions comprising:

a first set of instructions for outputting a first pulse width modulation (PWM) signal supplying alternating current (AC) power and a second PWM signal;

a second set of instructions for converting the second PWM signal to a direct current (DC) signal;

a third set of instructions for comparing the first PWM signal to the converted second PWM signal;

a fourth set of instructions for producing an output voltage being an alternating current (AC) according to the comparison of the first PWM signal and the converted second PWM signal;

a fifth set of instructions for rectifying and voltage-dividing the output voltage to generate a rectifying and voltage-dividing result; and a sixth set of instructions for adjusting the second PWM signal according to the rectifying and voltage-dividing result.

19. The power supply apparatus of claim 6, wherein the generated waveform is a pulse waveform.

20. The power control apparatus of claim 1, wherein the load comprises a developing unit of a printer.

21. A printer comprising:

a load;

a power supply unit including (1) a controller that generates a first pulse width modulation (PWM) signal and a second PWM signal, (2) a conversion unit that converts the second PWM signal to a direct current (DC) signal, (3) a comparator that compares the first PWM signal and the converted second PWM signal, (4) a switching unit that generates a waveform having a voltage according to a comparison of the first PWM signal and the converted second PMW signal, and (5) a transformer that produces an output voltage according to the waveform generated by the switching unit; and a rectifier and voltage divider coupled to the transformer for rectifying and voltage-dividing the output voltage of the transformer to output a rectifying and voltage-dividing result, wherein the output voltage of the transformer is supplied to the load, and the rectifying and voltage-dividing result is fed back to the controller, wherein the controller adjusts the second PWM signal according to the fed back rectifying and voltage-dividing result in order to reduce a fluctuation of the output voltage of the transformer due to impedance fluctuation of the load.

22. The printer of claim 20, wherein the load comprises a developing unit.

* * * * *